United States Patent [19]

Hoegh

[11] E Patent Number: Re. 33,654

[45] Reissued Date of Patent: Aug. 6, 1991

[54] DRAFTING DEVICE

[76] Inventor: Poul E. Hoegh, 655 Chatsworth Pl., San Jose, Calif. 95128

[21] Appl. No.: 501,004

[22] Filed: Mar. 29, 1990

Related U.S. Patent Documents

Reissue of:

[64] Patent No.: 4,823,475
Issued: Apr. 25, 1989
Appl. No.: 170,832
Filed: Mar. 21, 1988

[51] Int. Cl.[5] ..... B43L 13/14

[52] U.S. Cl. ..... 33/449; 33/432; 33/27.05

[58] Field of Search ..... 33/449, 432, 27.05, 33/448, DIG. 1

[56] References Cited

U.S. PATENT DOCUMENTS

| | | | |
|---|---|---|---|
| 2,596,322 | 5/1952 | Zumwalt | 33/DIG. 1 X |
| 2,694,164 | 1/1954 | Geppelt . | |
| 2,810,197 | 10/1957 | Sherry | 33/432 |
| 2,998,654 | 9/1961 | Hancox . | |
| 3,109,240 | 11/1963 | Bernier . | |
| 3,221,410 | 12/1965 | Malven . | |
| 3,258,843 | 7/1966 | Nosser . | |
| 3,266,154 | 8/1966 | Neon . | |
| 3,266,831 | 1/1966 | Tavernier . | |
| 3,300,863 | 1/1967 | Pirogow . | |
| 3,318,003 | 5/1967 | Pirogow . | |
| 3,332,152 | 7/1967 | Dru . | |
| 3,389,470 | 6/1968 | Johnson . | |
| 3,422,537 | 1/1969 | Dewey et al. . | |
| 3,464,117 | 9/1969 | Johnson | 33/77 |
| 3,492,727 | 2/1970 | Klok . | |
| 3,596,361 | 8/1971 | Pirogow . | |
| 3,646,683 | 3/1972 | Barzee . | |
| 3,672,062 | 6/1972 | Baker . | |
| 3,718,975 | 3/1973 | Ross . | |
| 3,719,995 | 3/1973 | Sauragean . | |
| 3,783,519 | 1/1974 | Sartori . | |
| 3,786,567 | 1/1974 | Dangay . | |
| 3,826,007 | 7/1974 | Senshu et al. . | |
| 3,851,394 | 12/1974 | Ihms . | |
| 3,852,889 | 12/1974 | Atkins . | |
| 3,872,597 | 3/1975 | Tennant . | |
| 3,945,123 | 3/1976 | Tortorici . | |
| 3,978,587 | 9/1976 | Baugh . | |
| 4,053,987 | 10/1977 | Ram . | |
| 4,075,762 | 2/1978 | Ohtake . | |
| 4,117,599 | 10/1978 | Tavernier et al. . | |
| 4,137,635 | 2/1979 | Harvey . | |
| 4,159,571 | 7/1979 | Jervis . | |
| 4,254,555 | 3/1981 | Julian . | |
| 4,267,656 | 5/1981 | Solomon | 33/DIG. 1 X |
| 4,357,757 | 11/1982 | Wurtz . | |
| 4,360,975 | 11/1982 | Wurtz . | |
| 4,380,124 | 4/1983 | Smith . | |
| 4,453,318 | 6/1984 | Hayes . | |
| 4,565,016 | 1/1986 | Horbinski . | |
| 4,586,265 | 5/1986 | Hopkins . | |
| 4,672,749 | 6/1987 | Tamari . | |

FOREIGN PATENT DOCUMENTS

| | | | |
|---|---|---|---|
| 179059 | 5/1922 | United Kingdom | 33/449 |

*Primary Examiner*—Harry N. Haroian
*Attorney, Agent, or Firm*—Michael L. Harrison

[57] ABSTRACT

A drafting device (10) is provided for drawing parallel lines as well as true perspective lines, comprising carriage means (11) movable over a drafting surface (12) on wheel assembly means (20) and (21). A ruler (124) is located on carriage means (11) and has an unobstructed drafting edge (125) constantly co-linear with a true radial line to a chosen vanishing point. Selectively variable ratio transmission means (31), between wheel assembly means (20) and (21), permit ruler (124) to move over drafting surface (12) in a parallel or an arcuate manner about a preset vanishing point on or outside drafting surface (12). Magnet means are included for maintaining wheel assemblies (20) and (21) in frictional contact with drafting surface (12) and brake means are included to lock carriage (11) on drafting surface (12) in selected positions. Presetable stop means are provided to preset a plurality of vanishing points.

18 Claims, 7 Drawing Sheets

DRAFTING DEVICE

Matter enclosed in heavy brackets [ ] appears in the original patent but forms no part of this reissue specification; matter printed in italics indicates the additions made by reissue.

BACKGROUND OF THE INVENTION

This invention relates to the field of drafting and more particularly to drafting devices for use in making perspective drawings.

Architects, engineers and the like, who often need to make perspective drawings, generally need to utilize vanishing points that are located considerable distances outside the edges of the drawing board, often as much as 8 to 10 feet or more outside the drawing board edge, to provide the general size and realistic detail of the drawing being made.

Although a number of devices have been developed to assist drafters to make perspective drawings, none of these have become generally available to architects and others who make perspective drawings, due to limitations in providing suitable vanishing points at various distances outside the drawing board, complicated methods of utilization, and high acquisition cost due to complicated mechanisms.

Some of such previous art includes U.S. Pat. Nos. 3,492,727 by J. Klok, 3,464,117 by J. Johnson, 4,137,635 by D. Harvey and 3,389,470 by J. Johnson.

Others have utilized a combination of mechanical and electronic devices making the cost of these prohibitive for general use. Some have required permanent fastening to a drawing board, limiting portability and rapid changing of orientation on the drafting surface.

U.S. Pat. No. 3,672,062 by A. Baker shows a portable drafting device using a magnetized roller that however only will make parallel lines.

U.S. Pat. No. 4,586,265 by W. Hopkins shows a perspective drawing apparatus utilizing two wheels of different diameter on a common axle to provide some vanishing points in or outside the board by varying the distance between the wheels. This device will not provide a vanishing point that is infinitely far away to make parallel lines and requires that the drafter applies constant pressure to the device on the drawing board to prevent loss of orientation to a selected vanishing point. Vanishing point can not be switched from left to right and only one vanishing point can be set at a time.

Generally, whenever possible, vanishing points are chosen to lie within the boundaries of the drafting board, where they may be easily marked, for instance by a pin pressed into the board, against which a ruler is located and pivoted around to provide means for drawing perspective lines converging to such a vanishing point. Often much greater distance is required to the vanishing point, causing it to lie outside the edge of the drafting board, sometimes many feet away.

SUMMARY OF THE INVENTION

It is therefore an object of this invention to provide a novel drafting device for facilitating production of accurate perspective drawings.

It is further an object of this invention to provide a novel drafting device, as above, that may instantaneously be converted from a perspective drafting device to a conventional drafting device for utilization in making parallel lines similar to a conventional engineer's drafting machine, yet may instantaneously be converted back to a perspective drafting device to work to previously preset vanishing points.

It is another object of this invention to provide a novel drafting device that does not require permanent physical attachment to a drafting board, yet may be moved over the surface of the drafting board without loosing a pre-set orientation to a selected vanishing point.

It is a further object of this invention to provide a novel drafting device such as above, that may be locked to the board at any location of the surface thereof, thereby to prevent disorientation of the device relative to the board, upon the operator releasing manual hold on the drafting device.

It is a further object of this invention to provide a novel drafting device that automatically may be unlocked from a locked location on the drafting board, upon an operator actuating a hand control means to move the device to a different location on the board without loss of orientation to a selected vanishing point upon perspective mode having been selected, and without loss of parallel orientation upon parallel mode having been selected.

It is another object of this invention to provide a novel drafting device that permits an operator to preset multiple vanishing points anywhere on or outside the board to either side thereof and to instantly select any of these preset vanishing points as required.

It is further an object of this invention to provide a novel drafting device that is supplied with magnetic means that, in conjunction with ferrous underlay means below the drafting surface, provide frictional retaining means for retaining the drafting device firmly on the drafting surface.

It is another object of this invention to provide a novel drafting device that may utilize specifically configured magnetic wheels that each contact the drafting surface only at substantially a single point and that, in conjunction with a ferrous underlay material below the drafting surface, provide nonslip contact between the drafting surface and the wheels of the drafting device.

It is a still further object of this invention to provide a novel drafting device that contains braking means to selectively lock the magnetic contact wheels of the drafting device in place, for instance, upon release of a manual operating knob, thereby to maintain the drafting device firmly in position on the drafting board by magnetic force, until it is required to move the drafting device to a new position, thus allowing the operator to use a slanting drafting board without fear of the drafting device rolling down the board.

It is yet another object of this invention to provide a novel drafting device that does not overly obscure the drafting area of the drafting board.

It is another object of this invention to provide a novel drafting device that utilizes at least two contact wheels interconnected by an infinitely variable ratio transmission adapted to provide infinitely variable vanishing point distances to either side of the drafting board.

It is a further object of this invention to provide a novel drafting device that is supplied with an easily locatable 1:1 ratio position, to provide an infinitely distance vanishing point for parallel motion of the device, whereby vertical lines on a perspective drawing may be accomplished, for instance, through use of a triangle located on the ruler of the device, or simply by locating the drafting device in a vertical position on the drafting board.

It is yet another object of this invention to provide a novel drafting device that is sufficiently simple in construction to permit manufacturing of the device at a reasonable cost.

It is another cost of this invention to provide a novel drafting device that may be easily used by any conventional drafter without requiring specialized knowledge.

These and other objects, features and advantages of the present invention will become apparent from the following detailed description taken in connection with the accompanying drawings.

Figure 1:
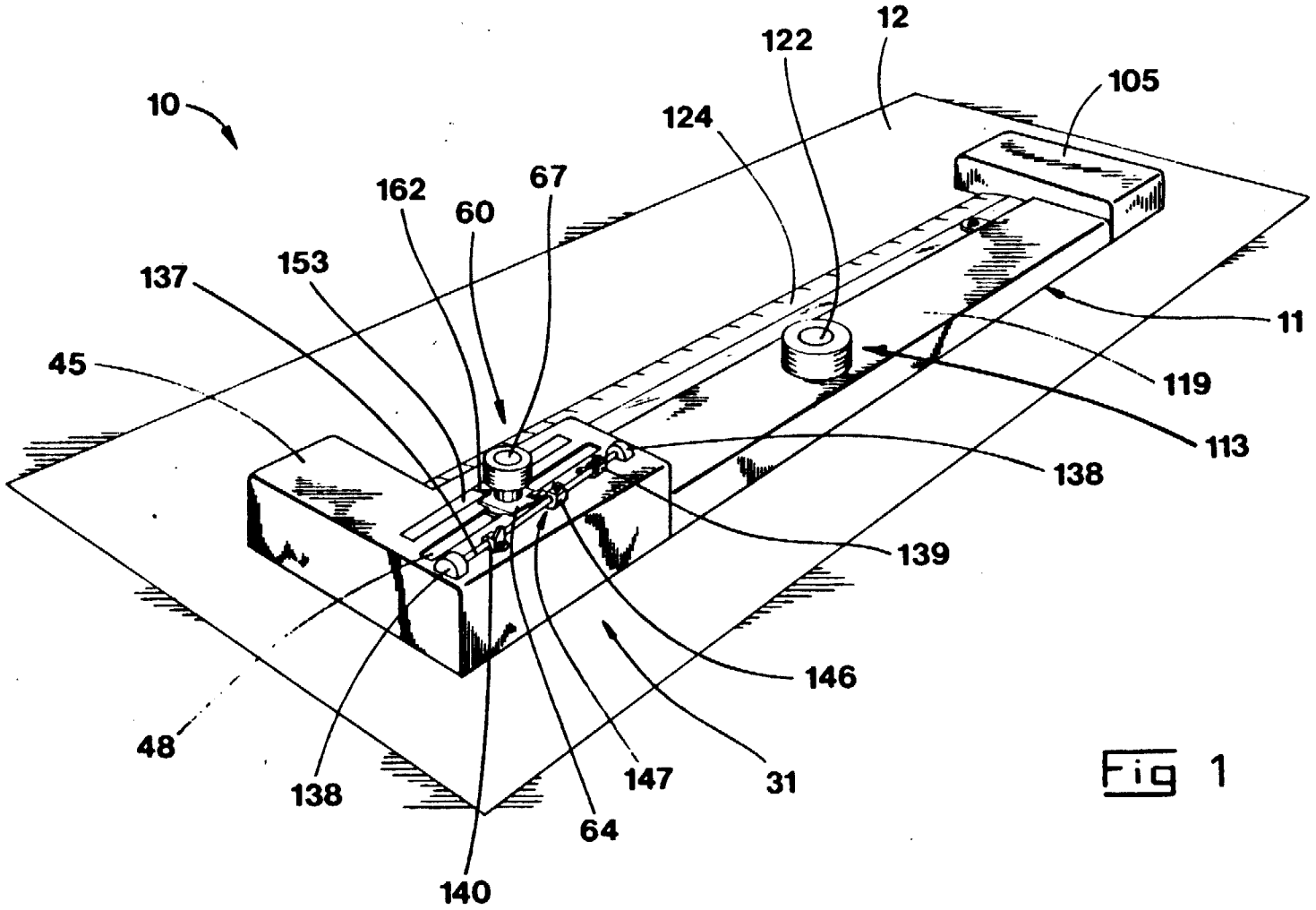
FIG. 1 is a perspective view of a drafting device illustrating a preferred embodiment of the present invention.

| | REFERENCE NUMERAL LIST | Shown on FIGS. |
|---|---|---|
| 10 | Drafting device. | 1 |
| 11 | Carriage. | 1-2 |
| 12 | Drafting surface. | 1-6-12-13-14 |
| 13 | Base plate. | 2-8-9-12 |
| 13L | Base plate. Left end | 2-7 |
| 13R | Base plate. Right end | 2-6 |
| 14 | Axle support. Left, Left wheel assy. | 2-7 |
| 15 | Axle support. Right, Left wheel assy. | 2-7 |
| 16 | Axle support. Left, Right wheel assy. | 2-6 |
| 17 | Axle support. Right, Right wheel assy. | 2 |
| 18 | Axle. Left wheel Assy. | 2-7 |
| 19 | Axle. Right wheel Assy. | 2-6 |
| 20 | Wheel assy. Left | 2-7-12 |
| 21 | Wheel assy. Right | 2-12 |
| 22 | Common wheel axis | 2-12 |
| 23L | Aperture. Left | 2-7 |
| 23R | Aperture. Right | 2-6 |
| 25L | Lower portion. Left wheel assy. | 12 |
| 25R | Lower portion. Right wheel assy. | 6-12 |
| 27 | Short distance, Base plate to drafting surface. | 6-12 |
| 28 | Slide pad. | 2-6 |
| 28A | Slide pad thickness | 6 |
| 29L | Slide pad location left side | 2 |
| 29R | Slide pad location right side | 2 |
| 31 | Variable Ratio transmission. | 1-2-7-8 |
| 31L | Variable Ratio transmission. Left side | 2-7 |
| 31R | Variable Ratio transmission. Right side | 2-7 |
| 32 | Axle support. Con. Dr. Member Left end | 2-7 |
| 32T | Axle support. Con. Dr. Member Top edge | 7 |
| 33 | Axle support. Con. Dr. Member Right edge | 2-7 |
| 33T | Axle support. Con. Dr. Member Top edge | 7 |
| 34 | Axle. First conical drive member | 2-7 |
| 35 | Axle. Second conical drive member | 2-7 |
| 35R | Axle. Second conical drive member Right end | 2-6 |
| 36 | First Conical drive member. | 2-4-5-7 |
| 36S | First Conical drive member. Small end | 2-7 |
| 36B | First Conical drive member. Big end | 2-7 |
| 37 | Second Conical drive member. | 2-4-5-7 |
| 37S | Second Conical drive member. Small end | 2-7 |
| 37B | Second Conical drive member. Big end | 2-7 |
| 39 | Cylindrical portion. First conical dr. mbr. | 2-7 |
| 40 | Cylindrical portion. Second conical dr. mbr. | 2-7 |
| 43 | Timing gear. First conical dr. mbr. | 2-7 |
| 44 | Timing gear. Second conical dr. mbr. Right axle end | 2 |
| 45 | Transmission cover plate. | 1-3-4-5-8 |
| 45A | Transmission cover plate. Lower surface | 3 |
| 45B | Transmission cover plate. Upper surface | 3-8 |
| 48 | Longitudinal slot. Transmission cover plate | 1-5-8 |
| 49 | Opening. Between conical dr. mbrs. | 2 |
| 54 | Conical surface. First conical dr. mbr. | 7 |
| 55 | Conical surface. Second conical dr. mbr. | 7 |
| 60 | Transmission engage and release mechanism. | 1-3-8 |
| 61 | Hollow bolt. | 3 |
| 61T | Hollow bolt. Thread | 3 |
| 62 | Hollow bolt. Head | 3-4-5 |

-continued

| REFERENCE NUMERAL LIST | | Shown on FIGS. |
|---|---|---|
| 63 | Hollow bolt. Upper key portion of head | 4-8 |
| 64 | Washer plate | 1-3-4-5-8 |
| 65 | Washer plate. Upper plate portion | 4-5 |
| 66 | Washer plate. Lower key portion | 4-8 |
| 67 | Transmission control knob. | 1-3-4-5-8 |
| 68 | Transmisson control knob. Lower surface. | 3 |
| 69 | Axial bore. Hollow bolt. | 3 |
| 70 | Vertical shaft. | 3 |
| 71 | Forked lower end. Vertical shaft | 3 |
| 72 | Power transfer wheel | 2-3-4-5 |
| 73 | Axle. Power transfer wheel. | 3 |
| 74 | Vertical slot. Hollow bolt | 3 |
| 75 | Upper bolt end. Hollow bolt | 3 |
| 76 | Pin. Transverse in vertical shaft | 3 |
| 77 | Collar. On vertical shaft | 3 |
| 78 | Annular groove. Collar | 3 |
| 79 | Upper end. Vertical shaft | 3 |
| 80 | Setscrew. Collar | 3 |
| 81 | Central position. Power transfer wheel | 2 |
| 81P | Phantom line position. Power transfer wheel | 2 |
| 82 | Cavity. Transmission control knob | 3 |
| 83 | Upper end. Transmission control knob | 3 |
| 84 | Setscrew. Trans. contr. knob. Into annular groove | 3 |
| 85 | Sidewall. Trans. contr. knob. | 3 |
| 86 | Radial hole. Trans. contr. knob. | 3 |
| 87 | Spring. Transmission control knob | 3-4-5 |
| 88 | Closure cap. Cavity | 3 |
| 90 | Main brake shaft. | 2-7-9 |
| 90L | Main brake shaft. Left end | 2-7 |
| 90R | Main brake shaft. Right end | 2-6 |
| 91L | Left lever. Main brake shaft | 7 |
| 91R | Right lever. Main brake shaft | 6 |
| 92 | Support block. Main brake shaft | 2-9 |
| 93 | Left brake arm. | 2-7 |
| 94 | Shoe. Left brake arm | 7 |
| 95 | Pivot. Left brake arm | 7 |
| 96 | Leaf spring. Left brake arm | 2-7 |
| 97 | Attachment location. Leaf spring | 7 |
| 98 | Jackshaft. | 2-7 |
| 98L | Left end. Jackshaft | 7 |
| 98R | Right end. Jackshaft | 7 |
| 99 | Lever. Jackshaft, left end | 7 |
| 100 | Arm projection. Left brake arm | 7 |
| 101 | Direction of view for rotation orientation | 7 |
| 102 | Quadrant. Left brake | 2-7 |
| 103 | Screw. Quadrant to Jackshaft | 7 |
| 104 | Free end. Quadrant | 7 |
| 105 | Cover. Right wheel assembly | 1-6 |
| 107 | Right brake arm. | 2-6 |
| 108 | Pivot. Right brake arm | 6 |
| 109 | Brake shoe. Right brake arm | 6 |
| 110 | Extension spring. Right brake arm | 6 |
| 111 | Extreme end. Right brake arm | 6 |
| 112 | Contact portion. Right brake arm | 6 |
| 113 | Brake control mechanism. | 2 |
| 114 | Main post. Brake control mechanism | 9 |
| 115 | Spring. Brake control mechanism | 9 |
| 116 | Actuator bushing. Brake control mechanism | 9 |
| 117 | Enlarged dia. actuator portion. | 9 |
| 118 | Main lever. Main brake shaft | 2-9 |
| 119 | Central cover | 1-8-9 |
| 120 | Hole. Central cover | 9 |
| 121 | Upper end. Actuator bushing | 9 |
| 122 | Knob. Brake control | 1-9 |
| 123 | Screw. Knob | 9 |
| 124 | Ruler. | 1-2 |
| 125 | Drafting edge. Ruler | 2 |
| 126 | Magnet. Wheel assembly | 6-12-13 |
| 126N | North pole. Magnet | 12-13 |
| 126S | South pole. Magnet | 12-13 |
| 127 | Straight line. At ruler edge | 2 |
| 128L | Contact point. Left wheel assembly | 12 |

-continued

| REFERENCE NUMERAL LIST | | Shown on FIGS. |
|---|---|---|
| 128R | Contact point. Right wheel assembly | 12 |
| 129L | Contact disk. Left wheel assembly | 2-7-12 |
| 129R | Contact disk. Right wheel assembly | 2-12 |
| 130 | Convex peripheral surface. Contact disk | 12 |
| 131 | Brake disk. Wheel assembly | 6-7 |
| 132 | Cylindrical peripheral surface. Brake disk | 12 |
| 133 | Drafting board. | 12 |
| 134 | Ferrous underlay. | 12-13-14 |
| 135 | Protective cover. Drafting board | 12 |
| 136 | Airgap. Brake disk to drafting surface | 6 |
| 137 | Rod. Stop dogs | 1-8-10 |
| 138 | Mounting block. Rod | 1-8 |
| 139 | Right stop dog. | 1-8-11 |
| 140 | Left stop dog | 1-8 |
| 141 | Extending portion. Washer plate | 8 |
| 142 | Pointed lower stop finger. Washer plate | 8 |
| 143 | Upper stop finger. Washer plate | 8 |
| 144 | Lower projection. Right stop dog | 8 |
| 145 | Upper projection. Left stop dog | 8 |
| 146 | Center stop dog. Parallel lines | 1-8-10-11 |
| 147 | Central position. Rod | 1-8-10-11 |
| 148 | Annular groove. Central position | 10-11 |
| 149 | Screw. Center stop dog | 8-10-11 |
| 150 | Cylindrical tip. Screw, Center stop dog | 10-11 |
| 151 | Thread. Rod | 11 |
| 152 | Bore. Stop dog | 10-11 |
| 153 | Scale. Vanishing point distance indicator | 1-8 |
| 154 | Threaded hole. Stop dog | 10-11 |
| 155 | Pointed screw. Stop dog | 8-11 |
| 156 | Point. Screw | 11 |
| 157 | Timing gear. Left wheel assembly | 2-7-12 |
| 158 | Timing gear. Right wheel assembly | 2-12 |
| 159 | Timing belt. Left side | 2-7 |
| 160 | Timing belt. Right side | 2 |
| 162 | Central marking. Vanishing point scale | 1-8 |
| 163 | Scale pointer | 8 |
| 164 | Magnetic flux path. | 13 |
| 165 | Alternate wheel assembly | 14 |
| 166 | Alternate magnet position | 14 |
| 167 | Alternate flat magnet | 14 |
| 168 | North pole surface. Flat magnet | 14 |
| 169 | South pole surface. Flat magnet | 14 |
| 170 | Iron pole pieces. | 14 |
| 171 | Magnetic fluxlines | 14 |
| 172 | Magnetic fluxlines position | 14 |
| 173 | Horseshoe magnet position | 14 |
| 174 | Horseshoe magnet position | 14 |
| 175 | North pole. Horseshoe magnet | 14 |
| 176 | South pole. Horseshoe magnet | 14 |
| 177 | Magnetic fluxlines. Horseshoe magnet. | 14 |

DESCRIPTION OF THE PREFERRED EMBODIMENT

Figure 2:
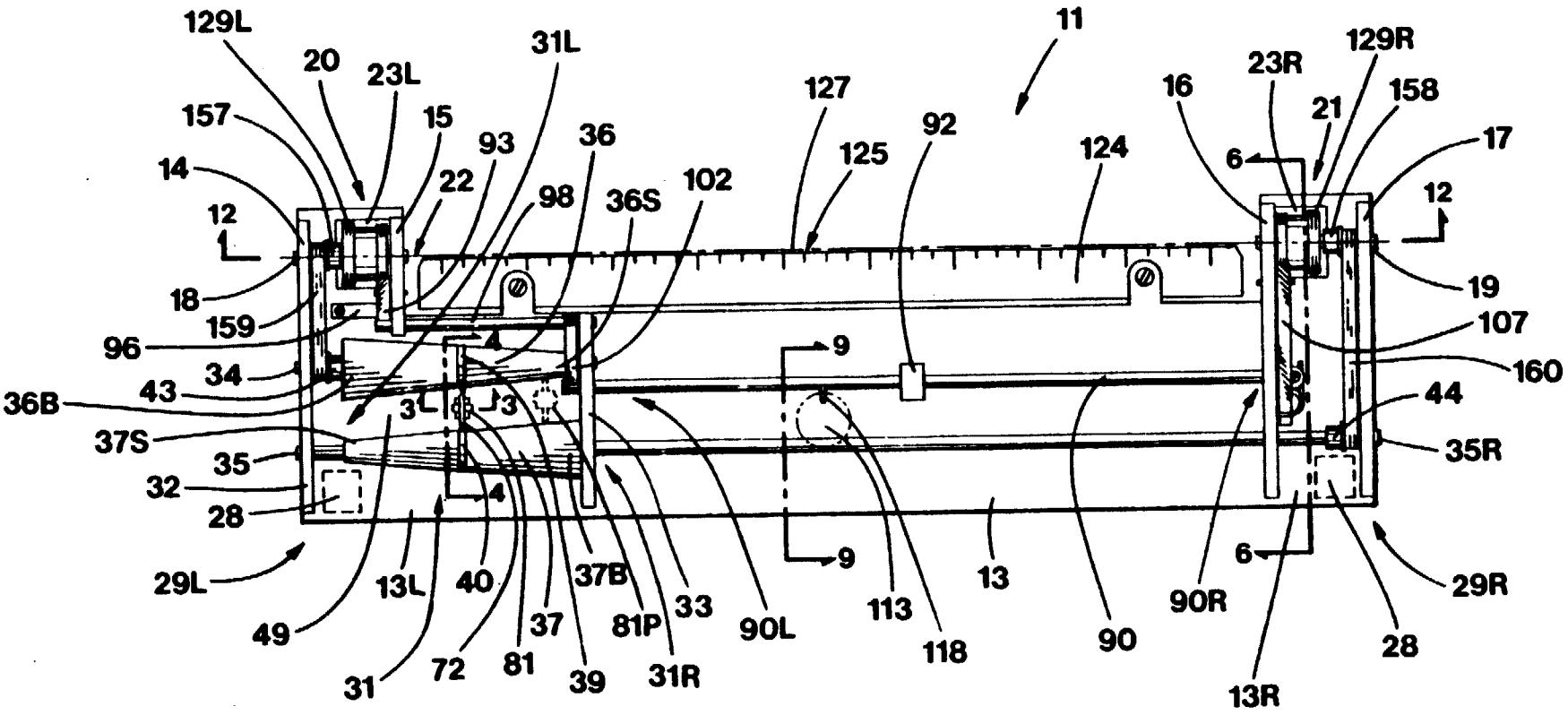
FIG. 2 is a top plan view of the drafting device shown in FIG. 1, with all covers omitted, illustrating one method of extending the wheel assemblies and drafting edge away from the variable ratio transmission portion of the drafting device, to permit unhampered drafting access to the drafting edge.
Figure 3:
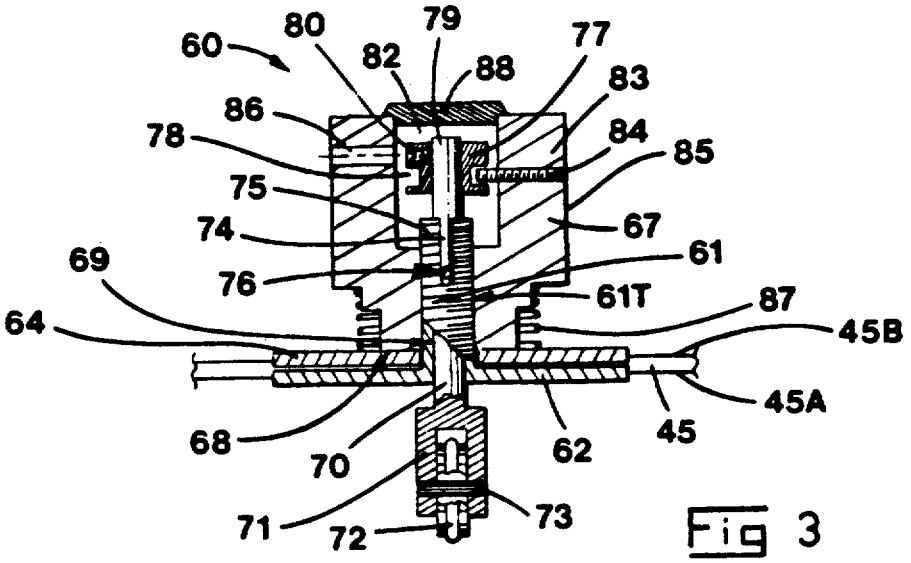
FIG. 3 is a fractional, vertical, sectional view, taken generally along the line 3—3 of FIG. 2.

Referring to FIGS. 1 and 2, a preferred embodiment of a drafting device incorporating the present invention is shown generally at 10, comprising a carriage 11, adapted to be positioned upon a drafting surface such as a sheet of drafting paper or the like 12, carriage 11 being adapted for translatory movement over drafting surface 12.

Carriage 11, in this preferred embodiment, comprises a baseplate 13, of substantially elongated shape. Baseplate 13 has a left end 13L and a right end 13R. Left end 13L is supplied with upwardly extending axle supports 14 and 15. Right end 13R is supplied with upwardly extending axle supports 16 and 17. A left wheel axle 18 is rotatably supported in and between axle supports 14 and 15, a right wheel axle 19 is rotatably supported in and between axle supports 16 and 17. Axles 18 and 19 are located substantially parallel to baseplate 13, have a substantially common axis 22 and are independently rotatable. Left wheel axle 18 has a left wheel assembly 20 attached thereto and right wheel axle 19 has a right wheel assembly 21 attached thereto. An aperture 23L is located in left end 13L of baseplate 13 and an aperture 23R is located in right end 13R of base plate 13.

A lower portion 25L and 25R of each of wheel assemblies 20 and 21 protrudes through apertures 23L and 23R respectively for a short distance 27, maintaining base plate 13 a distance 27 above drafting surface 12 upon carriage member 11 being located thereon. Slide pads 28, made of low friction material such as Teflon or the like, are, in this embodiment, attached below base plate 13 at positions 29 Land 29R, at left baseplate end 13L and right baseplate and 13R respectively, suitable to help carry and stabilize carriage member 11. Slide pads 28 have a thickness 28a, substantially equal to distance 27 to maintain base plate 13 in a substantially parallel relationship above drafting surface 12, and permit easy and substantially frictionless translatory movement of carriage 11 over drafting surface 12.

A variable ratio transmission 31 is located on base plate 13 and is adapted to selectively connect left wheel axle 18 to right wheel axle 19 and selectively disconnect left wheel axle 18 from right wheel axle 19. Variable ratio transmission 31 comprises in this preferred embodiment, an infinitely variable ratio transmission having a pair of axle supports 32 and 33 which extend upwards from left end 13L of base plate 13 and rotatably support axles 34 and 35 in parallel relationship to each other. A first substantially conical drive member 36 is attached to axle 34 between axle supports 32 and 33.

First conical drive member 36 has its big diameter end 36B toward the left side 31L of variable ratio transmission 31 and it's small diameter end 36S toward the right side 31R of variable ratio transmission 31. Axle 34, in this embodiment, has a timing gear 43 attached thereto at the big diameter end 36B of conical drive member 36.

Axle 35 has a second substantially conical drive member 37 attached thereto between axle supports 32 and 33. Conical drive members 36 and 37 are identical to each other, but reversed end for end to each other so that big end 37B of second conical drive member 37 is located toward right side 31R of variable ratio transmission 31R and small end 37S is located toward left side 31L of variable ratio transmission 31 to provide that the small diameter end of each conical drive member is juxtaposed to the big diameter end of the other conical drive member. Axle 35 extends through axle support 33 toward right end 13R of base plate 13, and through axle support 16 to axle support 17. Right end 35R of axle 35 has a timing gear 44 attached thereto.

A transmission cover plate 45 is attached over top edges 32T and 33T of cone axle supports 32 and 33 in parallel relationship to axles 34 and 35. A longitudinal slot 48 is located in cover plate 45 directly above and parallel to opening 49 between conical drive members 36 and 37.

A transmission engage and release mechanism is shown generally at 60, slideably located in slot 48 in cover plate 45, and comprises a hollow bolt 61, inserted toward into slot 48 from lower surface 45a of cover plate 45, hollow bolt 61 having a head 52 that is wider than slot 48, head 62 having an upper key portion 63 formed as a narrowed, elongated key, that projects part way into slot 48, that acts as a keyway for key portion 63, permitting head 62 to slide longitudinally in slot 48, yet preventing head 62 from rotating in slot 48.

A washer plate 64 is located over bolt 61 and has an upper plate portion 65 wider than slot 48, lower portion of washer plate 64 being formed as a downwardly depending, narrowed, elongated key portion 66, that projects part way down into slot 48, yet not deeply enough to meet upwardly depending key portion 63, key portion 66 permitting washer plate 64 to slide longitudinally in slot 48 as in a keyway, yet prevents washer plate 64 from rotating in slot 48.

A transmission control knob 67 is threadably engaged on thread 61T of hollow bolt 61 in such a manner, that upon transmission control knob 67 being screwed down on thread 61T of hollow bolt 61, lower surface 68 of knob 67 will contact upper portion of washer plate 64 and clamp hollow bolt 61 and washer plate 64 firmly together in any selected longitudinal position in slot 48.

Hollow bolt 61 contains an axial bore 69 that passes through the whole length of hollow bolt 61. A vertical shaft 70, is located, axially slidable, in bore 69. Shaft 70 is supplied with a forked lower end 71, containing a power transfer wheel 72, that is freely rotatable on a power transfer wheelaxle 73, located horizontally and transversely in forked end 71.

A slot 74 is located substantially centrally, transversely through upper end 75 of hollow bolt 61. A pin 76 is attached transversely through shaft 70, pin 76 projecting a short distance through shaft 70 on both sides thereof. Pin 76 engages in slot 74 in such a manner that it permits shaft 70 to slide freely up and down in axial direction in hole 69 of hollow bolt 61, yet prevents shaft 70 from rotating in hollow bolt 61. Pin 76 is located in shaft 70 relative to key portion 63 of hollow bolt 61 to provide that power wheel axle 73 is substantially parallel to conical drive member axles 34 and 35.

A collar 77, having an annular groove 78, is located on upper end 79 of shaft 70 and is vertically slidable thereon and fastenable thereto in any selectable position by means of a setscrew 80.

Transmission controlknob 67 is threadably engaged on thread 61T of upper bolt end 75 of hollow bolt 61 and adapted to be screwed up and down thereon. A cavity 82 depends axially downwards into upper end 83 of control knob 67 and provides room for collar 77 to move freely up and down therein. A setscrew 84 is threadably located horizontally through sidewall 85 of controlknob 67, extending into cavity 82 and engaging in annular groove 78. A hole 86 is radially located in control knob 67 in a position suitable to permit a tool, such as a screwdriver, hexwrench or the like to be engaged into setscrew 80 in order to loosen and tighten setscrew 80 to secure collar 77 in any selected position on shaft end 79.

A compression spring 87 is located around hollow bolt 61, between washer plate 64 and control knob 67. Spring 87 biases control knob 67, collar 77, shaft 70 and forked end 71 with power transfer wheel 72, upwards at all times. A closure cap 88 is located into top of cavity 82 to protect it from dust and dirt.

Substantially conical drive members 36 and 37 each have a cylindrical portion 39 and 40 respectively, substantially centrally of each conical drive member 36 and 37. Cylindrical portions 39 and 40 are of equal diameter to provide a transmission ratio of 1:1, upon power transfer wheel 72 being located directly between and in simultaneous frictional contact with cylindrical portions 39 and 40.

Wheel assembly axles 18 and 19 each have a timing gear 157 and 158 attached respectively thereto. A timing belt 159 connects timing gear 43 to timing gear 157 and a timing belt 160 connects timing gear 44 to timing gear 158, thereby providing extension means to position wheel assemblies 20 and 21 and drafting edge 125 away from vertical interference with variable ratio transmission 31 and facilitate true radial lines to be drawn, for instance with a vertically held pencil, along the whole length of drafting edge 125.

Timing gears 43 and 157 are of equal size and timing gears 44 and 158 are of equal size to provide a 1:1 ratio between conical drive member 36 and wheel assembly 20 as well as a 1:1 ratio between conical drive member 37 and wheel assembly 21.

It will be seen that, upon power transfer wheel 72 being selectively located in simultaneous frictional contact with cylindrical, equal diameter portions 39 and 40 of conical drive members 36 and 37 respectively to provide a transmission ratio of 1:1, and upon carriage member 11 being moved over drafting surface 12, wheel assemblies 20 and 21 will rotate at the same speed, as they roll over drafting surface 12, due to the fact that the diameters of contact disks 129L and 129R of wheel assemblies 20 and 21 respectively are the same, and that the ratios through equal diameter timing gear sets from conical drive members 36 and 37 to wheel assemblies 20 and 21 respectively are 1:1. Carriage 11 will therefore be able to move in a straight line path, perpendicular to ruler edge 125, over drafting surface 12, to permit parallel lines to be drawn along ruler edge 125.

Referring to FIG. 2, upon power transfer wheel 72 being moved and fastened in a position away from central position 81, to a position as shown in phantom at 81P, the difference in diameters contacted by power transfer wheel 72 on conical surfaces 54 and 55 of conical drive members 36 and 37 respectively, will determine the ratio between rotational speeds of wheel assemblies 20 and 21 relative to each other and permit arcuate travel of carriage 11 over drafting surface 12 about a vanishing point that, in the illustrated case, will be to the right of carriage 11, since the left wheel assembly 20 in this case will rotate faster than the right wheel assembly 21.

Figure 4:
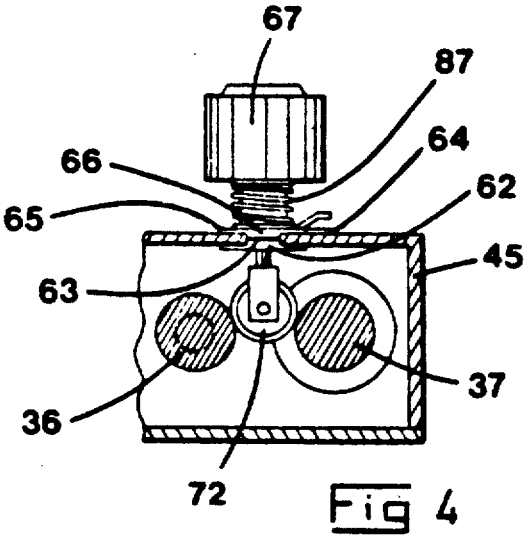
FIG. 4 is a fractional, vertical sectional view, taken generally along the line 4—4 of FIG. 2, showing the transmission control knob in it's "down" position, having clamped the control knob onto the cover and having lowered the power transfer wheel into contact with two opposing conical drive members.

Referring to FIG. 4, transmission control knob 67 is shown screwed fully down on thread 61T of hollow bolt 61 toward washer plate 64, clamping washer plate 64 and bolt head 62 onto transmission cover plate 45. Vertical shaft 70 has at the same time been positioned downwards, to place power transfer wheel 72 in firm frictional contact with both conical drive members 36 and 37. With transmission control knob 67 in this down position, setscrew 80 in collar 77 has been tightened onto upper end 79 of shaft 70, collar 77 being maintained in axial position, relative to transmission control knob 67, by setscrew 84, positioned into annular groove 78 of collar 77.

Figure 5:
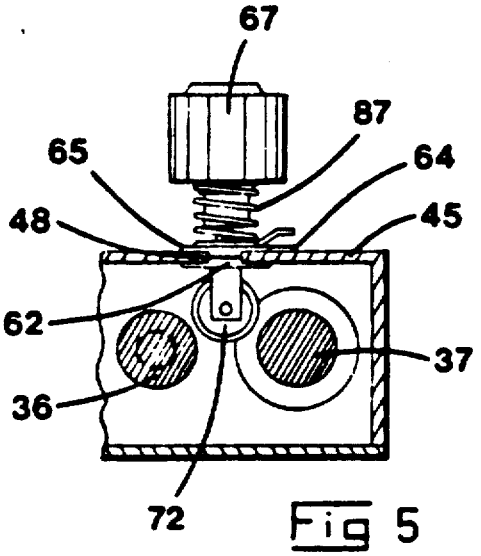
FIG. 5 is a fractional, vertical, sectional view, taken generally along the line 4—4 of FIG. 2, showing the transmission control knob, in it's "up" position, having unclamped the control knob from the cover and having lifted the power transfer wheel out of contact with two opposing conical drive members.

Upon transmission control knob 67 being screwed upwards on thread 61T of hollow bolt 61 to position shown in FIG. 5, clamping force on washer 64 has been released, permitting transmission engage and release mechanism 60 to slide freely back and forth along longitudinal slot 48 in transmission cover 45. Spring 87 constantly biases transmission control knob 67 upwards maintaining washer plate 64 and hollow bolt head 62 in light frictional contact with cover 45 to ensure that upper key portion 63 and lower key portion 66 stay in slot 48 to maintain proper directional orientation of washer plate 64 relative to cover 45 and, through pin 76 that is adapted to slide vertically in slot 74, to ensure that power transfer wheel 72 maintains perpendicular orientation to axles 34 and 35 of conical members 36 and 37. As transmission control knob 67 is screwed upwards, spring 87 will constantly bias transmission control knob upwards, thereby moving shaft 70 and forked end 71 upwards and bringing power transfer wheel 72 out of frictional contact with conical drive members 36 and 37, as shown in FIG. 5, thereby preventing scuffing of power transfer wheel along conical member surfaces 54 and 55 as transmission engage and release mechanism 60 is moved along slot 48.

Figure 7:
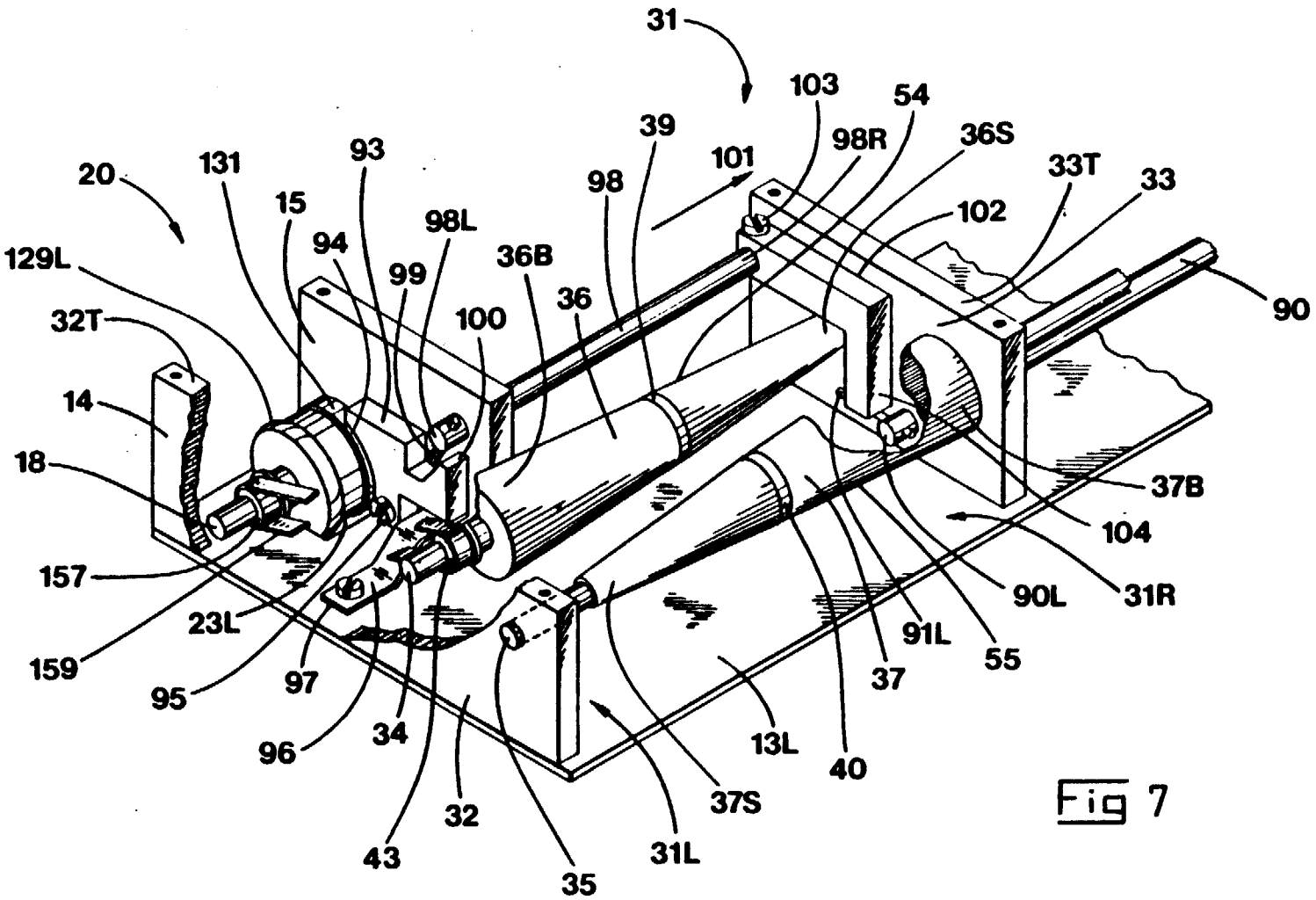
FIG. 7 is a fractional, partial cut-away, perspective view of the variable ratio transmission portion of the drafting device shown in FIG. 1.
Figure 8:
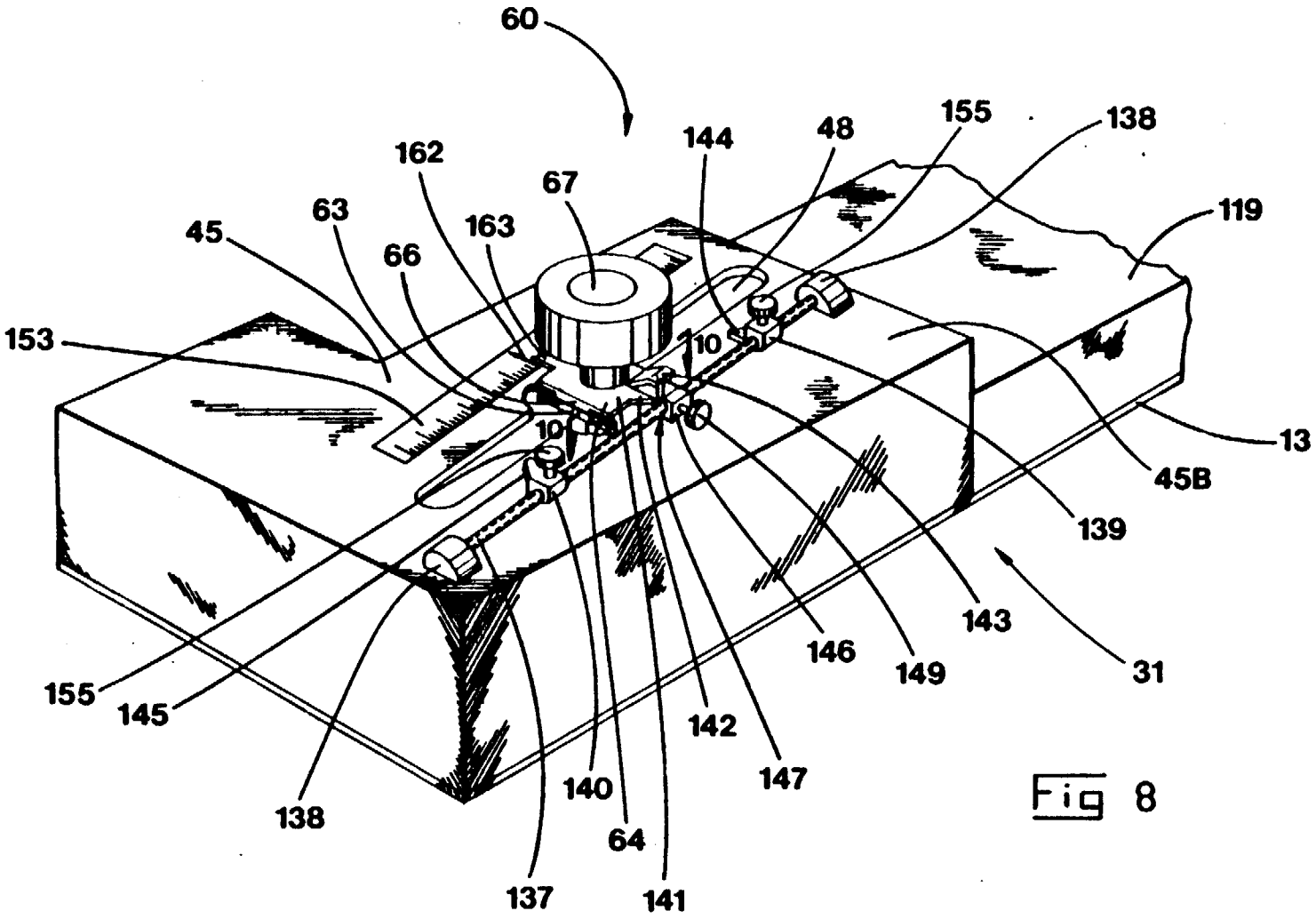
FIG. 8 is a fractional, part cut-away, perspective view of the variable ratio transmission end of the drafting device shown in FIG. 1, illustrating the presettable stop means.
Figure 9:
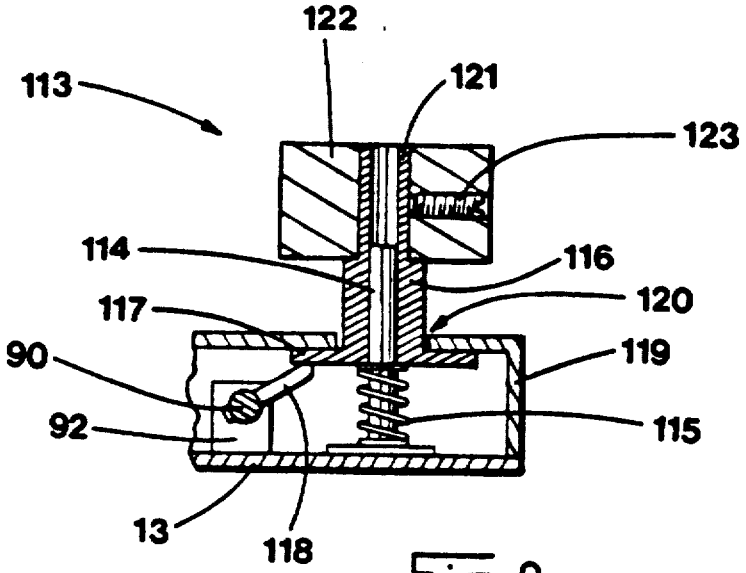
FIG. 9 is a vertical, fractional, part sectional view, taken generally along line 9—9 of FIG. 2.

Referring to FIGS. 7 and 9, a means for selectively and simultaneously locking wheel assemblies 20 and 21 against rotation thereto and respectively unlocking wheel assemblies 20 and 21 to permit rotation thereof is shown, comprising a main brake shaft 90, carrying an actuating lever 91L at left end 90L and an actuating lever 91R at right end 90R of brake shaft 90 respectively. A brake arm 93 is pivotally carried at pivot 95 on axle support 15 and is supplied with a brake shoe 94 adapted to fictionally engage wheel assembly 20 and lock this in place upon brake shoe 94 being pivoted toward wheel assembly 20. A leaf spring 96 is attached to baseplate 13 at 97 and biases brake arm 93 with brake shoe 94 toward wheel assembly 20 with sufficient force to provide locking means thereon. A jackshaft 98 is rotatably carried in wheel axle support 15 and transmission axle support 33 and is at its left end 98L supplied with a lever 99, adapted to engage with brake arm projection 100 on brake arm 93 and pivot brake shoe 94 away from wheel assembly 20 upon jackshaft 98 being rotated in a counterclockwise direction, when looking in direction indicated by 101.

A quadrant 102 has one end firmly attached to the right end 98R of jackshaft 98 by means of screw 103. Quadrant 102 reaches over conical drive member 36 and has a free end 104 depending down between conical drive members 36 and 37 to lever 91L. Upon main brake shaft 90 being rotated in clockwise direction when seen in direction 101, left lever 91L will push quadrant end 104 upwards, rotating jackshaft 98 counterclockwise, seen in direction 101, causing brake arm 93 to compress spring 96 and move brakeshoe 94 away from wheel assembly 20, allowing wheel assembly 20 to rotate freely.

Figure 6:
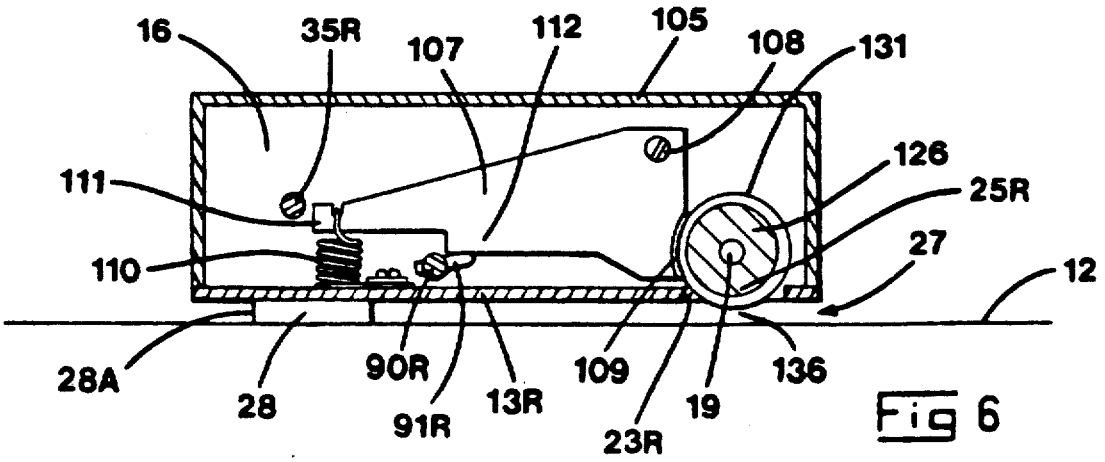
FIG. 6 is a vertical, sectional view, taken generally along the line 6—6 of FIG. 2.

Referring particularly to FIGS. 2 and 6, right hand end 90R of main brakeshaft 90 carries a lever 91R. A right brake arm 107 is pivotally mounted at 108 on axle support 16 and carries a brake shoe 109 adapted to frictionally engage wheel assembly 21 and lock this in place upon brakeshoe 109 being pivoted toward wheel assembly 21. An extension spring 110 is attached between baseplate 13 and extreme end 111 of brake arm 107 and biases brake shoe 109 toward wheel assembly 21 with sufficient force to provide locking means thereon. A portion 112 of brake arm 107 is located directly above lever 91R. Upon main brake shaft 90 being rotated in clockwise direction, when seen in direction 101, lever 91R will force brake arm extreme end 111 upwards, causing brake arm 107 to rotate around pivot 108, thereby extending spring 110 and moving brake shoe 109 away from wheel assembly 21, allowing wheel assembly 21 to rotate freely. A cover 105 is located over wheel assembly 21.

Refering particularly to FIG. 9, a manual brake control mechanism is shown at 113 adapted to provide brake release and device traversing enable means comprising a main post 114, attached to baseplate 13. A compression spring 115 is located around post 114. A cylindrical actuator bushing 116 is slidingly located on post 114 directly above a compression spring 115. Actuator bushing is freely rotatable on post 114 to prevent any rotary moment from being applied to the drafting device from manual manipulation of brake control knob 122.

Lower end of bushing 116 has an enlarged diameter portion 117 that extends out over a lever 118 that is firmly attached to and located substantially centrally on main brakeshaft 90. A main brake shaft support block 92 is located on baseplate 13 to rotatably support main brakeshaft 90 at manual brake control mechanism 113. A central cover 119 is attached to base plate 13 and extends over enlarged diameter actuator portion 117. A hole 120 is located in cover 119 and is large enough to permit upper portion 121 of bushing 116 to extend up therethrough, yet small enough to retain enlarged diameter portion 117 below cover 119. A manual operating knob 122 is attached to upper end 121 of bushing 116 by means of screw 123.

A drafting scale 124 is attached to drafting device 10 in such a manner as to permit drafting scale 124 to rest on drafting surface 12 and to retain a drafting edge 125 of drafting scale 124 substantially coincidental with a straight line 127, stretching from a point of contact between wheel assembly 20 and drafting surface 12 to a point of contact between wheel assembly 21 and drafting surface 12, line 127 therefore at all times constituting a portion of a radial line extending to any selected vanishing point.

Figure 12:
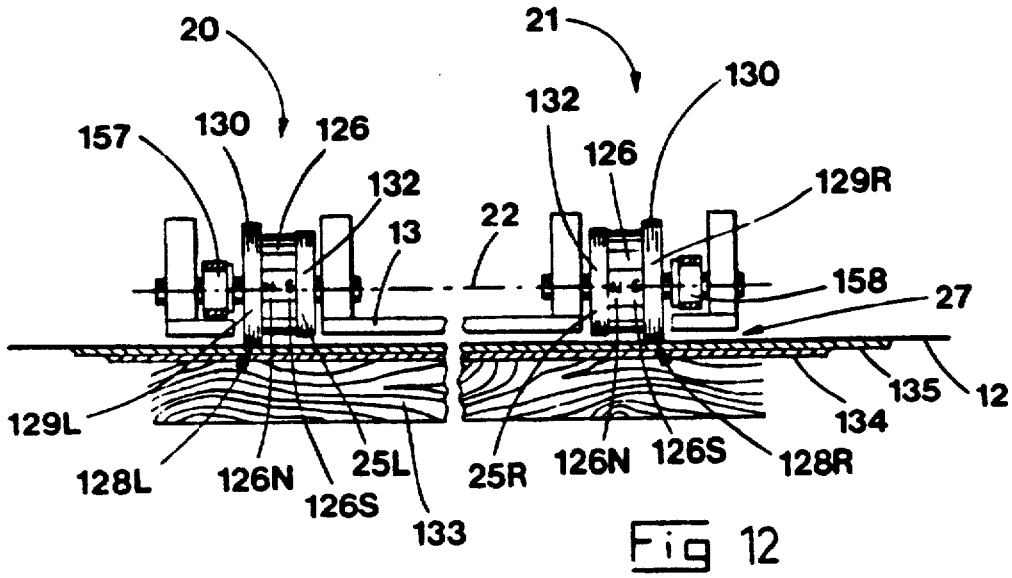
FIG. 12 is a fractional, part sectional elevation of 2 magnetic wheel assemblies of the drafting device shown in FIG. 1, located on a drafting surface with a ferrous underlay, taken on the line 12—12 of FIG. 2.

Refering particularly to FIG. 12, wheel assemblies 20 and 21 are shown, each comprising a substantially cylindrical permanent magnet 126 having magnetic orientation in axial direction, providing, for instance, a North pole at one flat end surface 126N and a South pole at the other end surface 126S of each magnet. Magnet 126 is sandwiched between a magnetizable drafting surface contact disk 129 having a convex peripheral surface 130, and a magnetizable brake disk 131 having a cylindrical peripheral surface 132 slightly smaller in diameter than disk 129.

Magnet 126 and contact disks 129L and 129R and brake disks 131 are attached firmly and concentrically on each of axles 18 and 19 respectively. Since axles 18 and 19 have a common axis, it will be seen that upon the drafting device 10 being placed on a substantially flat drafting surface 12, the [convex] surfaces 130 of contact disk 129L and 129R will each contact drafting surface 12 at [one point only] *points substantially on the tangent of the disk, which tangent points lie on a line which extends through the vanishing point.* Since brake disks 131 have slightly smaller diameters than contact disk 129L, and 129R, brake disks 131 will not be in contact with drafting surface 12. This special wheel assembly construction will prevent a slipping or scuffing action on drafting surface 12, upon carriage 11 being moved in an arcuate manner over drafting surface 12, even though a brake disk 131 and a contact disk 129L or 129R respectively are both firmly attached to the same wheel assembly axle at different radial distances from the center of arcuate motion, since only one disk of each wheel assembly constantly contacts the drafting surface 12 [at only one point each].

Figure 13:
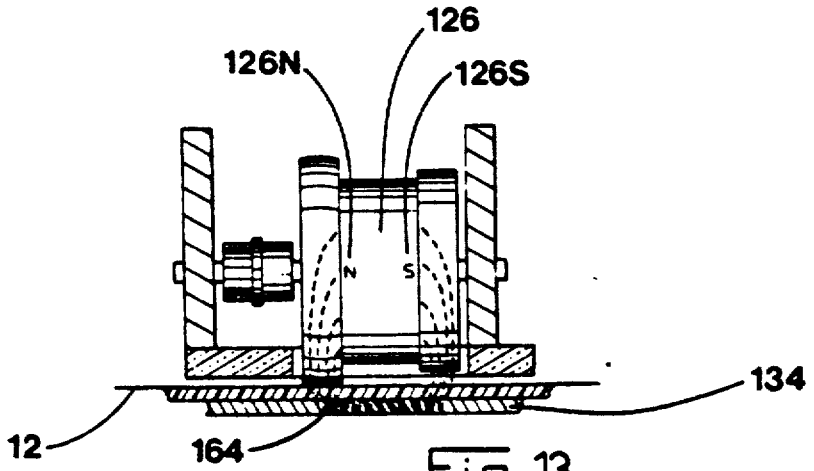
FIG. 13 is a fractional, part sectional elevation of a magnetic wheel assembly of the drafting device shown in FIG. 1, illustrating magnetic flux flow through magnetizable wheels and ferrous underlay taken on the line 12—12 of FIG. 2.

Refering to FIGS. 12 and 13, means for retaining drafting device 10 in firm contact with drafting surface 12 comprises, in this preferred embodiment, a drafting board 133, to be utilized in conjunction with drafting device 10. Drafting board 133 is covered with a ferrous material such as, for instance, thin iron sheet, to provide a ferrous underlay 134, above which a thin, conventional drafting board covering 135 of pliable plastic or linoleum may be attached. A drafting surface 12, such as a sheet of drafting paper is attached above covering 135 in conventional manner and drafting device 10 is placed on drafting surface 12. A magnetic flux path 164 will be formed from magnetic 126, through contact disk 129, down through drafting surface 12 and covering 135, to and along ferrous underlay 134 to below brake disk 131, up through covering 135, drafting surface 12 and airgap 136, through brake disk 131 and back to magnet 126, thereby providing sufficiently strong magnetic attraction between drafting device 10 and ferrous underlay 134 to permit drafting device 10 to roll freely on wheel assemblies 20 and 21 over drafting surface 12, yet prevent slippage between contact disks 129L and 129R and drafting surface 12.

Figure 10:
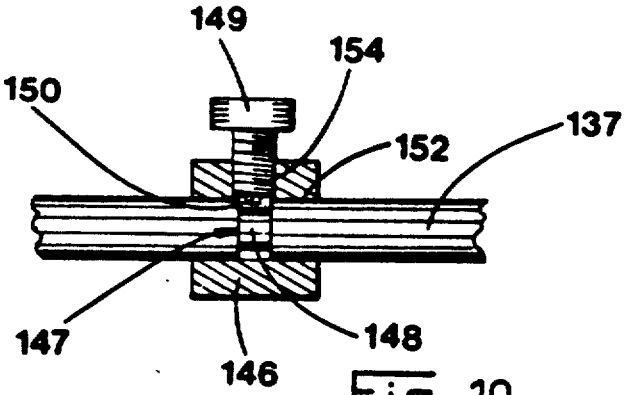
FIG. 10 is a fractional, part sectional elevation of a central stop dog, located on a plain, cylindrical rod, taken on the line 10—10 of FIG. 8.

Referring particularly to FIG. 10, means for pre-setting one or more vanishing point distances to the left or the right of the drafting device comprises a rod 137, located above transmission cover 45, substantially parallel to longitudinal slot 48. A plurality of adjustaable stop dogs 139 and 140 are slideably located on rod 137. Rod 137 is anchored at each end in blocks 138 that are attached to upper surface 45B of transmission cover 45. Washer plate 64 has an extending portion 141 that extends toward rod 137 and is split in a flat pointed stop finger 142 extending toward rod 137 and an upwardly displaced stop finger 143 extending toward rod 137. Stop dog 139 has a lower projecting portion 144 that extends partway in toward slot 48 and provides stop means against pointed stop finger 142. Upon transmission control knob 67 being turned counter clockwise, transmission engage mechanism 60 is released to permit mechanism 60 to be moved along slot 48 until upwardly displaced stop finger 143 has progressed over lower projection 144 and pointed stop finger 142 has abutted against lower projecting portion 144.

Stop dog 140 is located to the left side of transmission engage and release mechanism 60 and has an upper projecting portion 145 that extends partway in toward slot 48 and provides stop means against upwardly displaced stop finger 143. Upon the released transmission engage and release mechanism 60 being moved along slot 48, pointed stop finger 142 may progress below upper projecting portion 145 until upwardly displaced stop finger 143 has abutted against upper projecting portion 145. At this time transmission control knob 67 may be rotated clockwise to lock the transmission engage and release mechanism 60 in place on transmission cover 45 and place power transfer wheel 72 in contact with conical drive members 36 and 37 at a position that will provide the desired rotational ratio between wheel assemblies 20 and 21.

Figure 11:
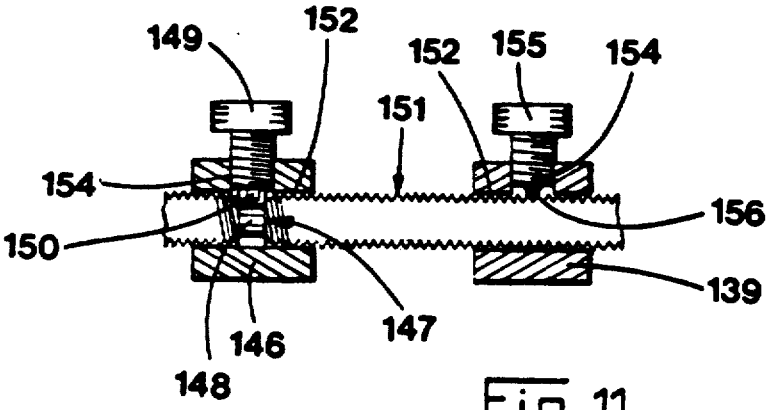
FIG. 11 is a fractional, part sectional elevation of a threaded rod stop dog mechanism, taken on the line 10—10 of FIG. 8.

Referring particularly to FIGS. 10 and 11, a center stop dog 146 may be located on rod 137, substantially between stop dogs 139 and 140, in a position 147, whereby transmission engage and release mechanism 60, upon pointed stop finger 142 being brought to abut against center stop dog 146, will position power transfer wheel 72 directly between central, cylindrical portions 39 and 40 of conical members 36 and 37 respectively, to provide a ratio of 1:1 between wheel assemblies 20 and 21. This corresponds to a vanishing point at a distance infinitely far away from device 10, whereby the device 10 will behave like a conventional drafting machine, able to draw parallel lines as device 10 is moved over drafting surface 12. Vertical lines may, for instance, be drawn through use of a triangle situated on the drafting edge 125, or by positioning device 10 vertically on drafting surface 12.

Rod 137 may be supplied with an annular groove 148, located substantially centrally of rod 137, at position 147 corresponding to position at which power transfer wheel 72 is able to contact cylindrical portions 39 and 40 of conical drive members 36 and 27. Center stop dog 146 may be supplied with a fastening screw 149 that has a cylindrical tip 150 adapted to fit into groove 148 to maintain center stop dog 146 in position 147 either with screw 149 fully tightened down, or with screw 149 slightly loosened on rod 137.

Upon screw 149 being loosened slightly, center stop dog 146 may be rotated 90 degrees on rod 137, away from pointed stopfinger 142, permitting transmission engage and release mechanism 60 to be moved freely to the left or right to provide a new, selected transmission ratio.

Upon it again being required to draw parallel or vertical lines, center stop dog 146 is rotated back 90 degrees on rod 137 and transmission engage and release mechanism 60 is moved so that pointed stop finger 142 is again abutted against center stop dog 146. Transmission control knob 67 may then be screwed down to clamp transmission engage and release mechanism 60 in place in slot 48, at the same time lowering power transfer wheel 72 into contact with central cylindrical portions 39 and 40 of conical members 36 and 37 respectively. This will provide a ratio of 1:1 between wheel assemblies 20 and 21 to permit parallel movement of ruler 124.

Rod 137 may be provided with a thread 151 along it's total length. A plurality of stopdogs 139 and 140, each having a cylindrical bore 152, are adapted to be slidingly located onto rod 137, to permit each of stop dogs 139 and 140 to freely slide axially along rod 137 over thread 151.

Each of stop dogs 139 and 140 is supplied with a threaded hole 154 and a screw 155 threadably inserted there into. Screw 155 is formed like a set screw with a pointed end 156, adapted to engage into thread 151 and permit each stopdog to be rotated through approximately 90 degrees on rod 137, from a horizontal attitute to a vertical attitude and back again, without losing a preselected axially oriented position, since pointed end 156 will be engaged in thread 151 and able to slide 90 degrees therein upon screw 155 being loosened slightly.

Upon it being required to move one of stop dogs 139 or 140 to a different position on rod 137, screw 155 is loosened more until pointed end 156 no longer engages in thread 151, after which the pertinent stop dog 139 or 140 may be moved slidingly along rod 137 to a new, selected position along rod 137 to provide a new preselected ratio position, corresponding to a new vanishing point distance. Screw 155 may then be tightened fully into thread 151 to provide a permanent vanishing point distance stop. Screw 155 may be loosened slightly on thread 151 to permit the pertinent stop dog 139 or 140 to be flipped into and out of engagement with stop fingers 142 and 143 respectively, as required, during a drafting operation.

Stop fingers 142 and 143 are thereby permitted to bypass central stopdog 146 and any stop dogs located to the left or to the right of central stop dog 146, as long as these stop dogs are flipped up and out of the way of stopfingers 142 and 143. Stopfingers 142 and 143 may then be moved to and engage with any stop dog that has been left flipped down.

A plurality of present vanishing point distances may thereby be utilized during a drawing operation, corresponding to the quantity of stop dogs 139 and 140 that are located on rod 137 plus the center stop dog 146, since any of such preset dogs may be momentarily flipped down as required.

A scale 153 may be located on cover 45, parallel to longitudinal slot 48, directly below or at a scale pointer 163, located on washer plate 64, scale 153 being supplied with markings to indicate vanishing point distances to left or right of device 10, obtained by positioning scale pointer 163 at such markings.

METHOD OF OPERATION

The preferred embodiment of a drafting device, embodying the present invention, comprises a movable carriage 11, as defined above, and a drafting surface support such as a drafting board 133, shown in FIGS. 7 and 11, having a magnetizable ferrous underlay 134, comprising, for instance, a thin iron sheet located thereon, above which a drafting surface 12, such as a sheet of drafting paper or the like, is attached.

The operator places carriage 11 on top of drafting surface 12 in a desired start position and marks this position on drafting surface 12, for instance, by making a pencil mark on drafting surface 12 at each end of ruler edge 125. Magnetic attraction between wheel assemblies 20 and 21, and ferrous underlay 134 will hold carriage member 11 firmly onto drafting surface 12 and brake shoes 94 and 109 will prevent wheel assemblies 20 and 21 from rotating, thereby locking carriage 11 firmly in place, preventing carriage 11 from inadvertently rolling away, even upon drafting surface 12 being located at a slanting angle.

Drafting mode is determined by selecting a desired vanishing point distance to the left or to the right of carriage 11. To do this, operator sets the ratio of rotation between wheel assembly 20 and wheel assembly 21 by rotating transmission control knob 67 counter clockwise, upon hollow bolt 61 having a right hand thread, thereby unclamping transmission engage and release mechanism 60 from transmission cover plate 45. Power transfer wheel 72 is thereby lifted out of contact with conical members 36 and 37 and transmission engage and release mechanism 60 may then be freely moved in slot 48 until pointed stop finger 142 points at central marking 162 on scale 153, indicating a 1:1 ratio between wheel assembly 20 and wheel assembly 21, corresponding to a an infinite vanishing point distance, upon drafting device 10 being required to be used as a conventional drafting machine for drawing parallel lines.

Power transfer wheel 72 will in this position be located directly above cylindrical, equal diameter portions 39 and 40 of conical drive members 36 and 37 respectively. Rotating transmission control knob 67 clockwise will lower power transfer wheel 72 downwards into contact with cylindrical portions 39 and 40 and at the same time clamp transmission engage and release mechanism 60 onto cover plate 45 in the selected position for drafting of parallel lines.

Upon it being required to utilize drafting device 10 for drawing lines that converge to vanishing points at specific distances to the left or right of drafting device 10, transmission control knob 67 is rotated counter clockwise to unclamp transmission engage and release mechanism 60 and lift power transfer wheel 72 out of contact with conical drive members 36 and 37, whereafter transmission engage and release mechanism 60 may be moved in slot 48 until scale pointer 163 points at the desired notation on scale 153, corresponding to the desired vanishing point distance to the left or to the right of the center marking 162 on scale 153, depending on whether a vanishing point is desired to the left or to the right of drafting device 10.

Transmission control knob 67 is then rotated clockwise to lower power transfer wheel 72 into contact with conical drive members 36 and 37 and clamp transmission engage mechanism 60 onto transmission cover plate 45 in the selected position.

The distance to the vanishing point will be determined by the difference in diameters of the conical drive members 36 and 37 at their points of contact with power transfer wheel 72. The selected position will provide a constant speed difference between wheel assembly 20 and wheel assembly 21, that will permit carriage 11 to move over drafting surface 12 in an arcuate manner, following a radial line that has its center in the desired vanishing point and extends through contact points 128L and 128R, between drafting surface 12 and wheel assemblies 20 and 21 respectively.

Since ruler edge 125 is located on drafting surface 12, directly above a straight line connecting contact points 128L and 128R, any line drawn along ruler edge 125 on drafting surface 12, independent of the arcuate position to which carriage 11 may be moved, will coincide with a straight line extending through the selected vanishing point. All lines, thus drawn, will therefore be true perspective lines, all converging to the same, selected vanishing point.

To avert errors through possible inadvertent wheel slippage on drafting surface 12, carriage 11 may, from time to time, be moved back to the start position, so that ruler edge 125 may be checked to the original pencil marks made on drafting surface 12, so that any inadvertently occurring position variation from the original start position may be corrected if necessary.

Figure 14:
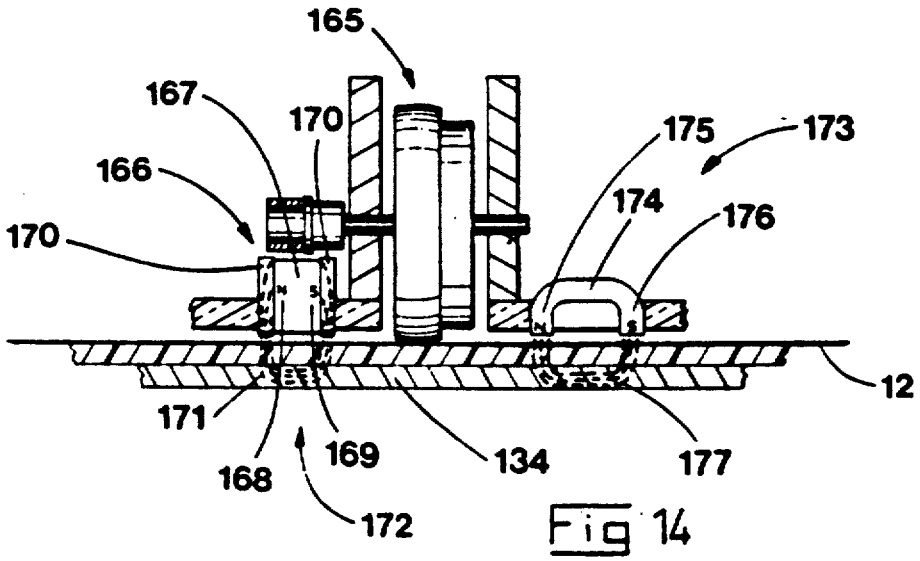
FIG. 14 is a fractional, mid vertical, part sectional view of two alternate methods of providing the drafting device, shown in FIG. 1, with magnetic means, in conjunction with a magnetizable underlay, for retaining the drafting device in firm contact with a drafting surface.

Referring to FIG. 14, an alternate method of providing means for retaining drafting device 10 on drafting surface 12 is shown comprising a wheel assembly 165, substantially similar to wheel assemblies 20 and 21, previously described, with the difference that magnet 126 has been eliminated from between contact disk 129L and brake disk 131 and none of these disks need to be made of magnetizable material.

At least one magnet 166 may be attached to baseplate 11 in such a manner that the North and South poles of magnet 166 are concentrated downwards towards end in close proximity of drafting surface 12 to permit a major portion of magnetic flux to pass through ferrous underlay 134.

Various types of magnets may be utilized for the above purpose. One type, shown at 166, comprises a flat magnet 167, magnetized through its flat surfaces 168 and 169 to provide, for instance, a North pole at flat surface 168 and a South pole at the opposite flat surface 169. Magnet 167 is sandwiched between two flat iron pole pieces, that are attached to baseplate 11 and depend down therefrom to close proximity of drafting surface 12, to permit magnetic fluxlines 171 to complete their magnetic circuit through ferrous underlay 134, as shown at 172 and provide magnetic attracting force between drafting device 10 and ferrous underlay 134.

A second magnet type is shown at 173, comprising a horseshoe magnet 174 attached on baseplate 11, magnet 174 having its North pole 175 and its South pole 176 located directly above drafting surface 12 to permit magnetic fluxlines 177 to complete their magnetic circuit through ferrous underlay 134 and provide concentrated magnetic attracting force between drafting device 10 and ferrous underlay 134.

It will be understood that the particular embodiments of the invention disclosed herein are for illustrative purposes and for clearness of understanding only and that various changes may be made therein without departing from the scope of the invention.

I claim:

1. A drafting device for use on a drafting surface to permit the drafting device to move upon the drafting surface in an arcuate manner about a vanishing point, comprising:

a carriage;

a rule on said carriage defining at least one drafting edge;

a first wheel assembly mounted to said carriage, at least one second wheel assembly mounted to said carriage, said first and said second wheel assembly being spaced from each other and adapted to support said carriage upon the drafting surface and permit translatory movement thereof upon the drafting surface, each said wheel assembly including contact disk means having a [convexly curved] peripheral surface adapted to provide each said wheel assembly with [single point] contact *at the tangent point at the periphery of the disk* with said drafting surface, said contact disk means on said first wheel assembly and said second wheel assembly having substantially the same outside diameter, said drafting edge on said rule being located substantially coincidental with a straight line reaching from said [single point contact] *tangent point* on said first wheel assembly to said [single point contact] *tangent point* on said second wheel assembly and coincidental with a true radial line extending to said vanishing point;

means on said carriage for conveying rotational energy linking said first wheel assembly and said second wheel assembly to each other, said means for conveying rotational energy including ratio means for establishing and maintaining a ratio of rotation between said first wheel assembly and said second wheel assembly, whereby radial distance from the drafting device to said vanishing point is governed by the ratio in said ratio means;

extension means on said carraige for extending said first wheel assembly, said second wheel assembly and said drafting edge of said rule away from said ratio means to permit manual drafting of true radial lines along said drafting edge unhampered by any portions of said means for conveying rotational energy, said extension means including extension drive means connecting said first wheel assembly and said second wheel assembly to said ratio means.

2. A drafting device as described in claim 1 wherein said extension drive means comprises timing belt and timing gear means linking said first wheel assembly and said second wheel assembly to said means for conveying rotational energy, said ratio means in said means for conveying rotational energy being adjustably variable to selectively set said radial distance of said arcuate motion.

3. A drafting device as described in claim 2 wherein said contact disk means is of magnetizable material and further comprising:

magnet means in said wheel assemblies;

magnetizable underlay means located below said drafting surface, magnetic flux of said magnet means being concentrated through said contact disk means toward said drafting surface.

4. A drafting device as described in claim 1, 2 or 3 in which said ratio means [in] *is* infinitely variable and including;

ratio control means on said means for conveying rotational energy for adjustably varying said ratio and further comprising;

brake means on said carriage;

brake control means on said carriage for selectively locking and unlocking said brake means.

5. A drafting device as described in claim 4 including means for adjustably setting said ratio to be 1:1 whereby to provide an infinitely large vanishing point distance to permit the drafting device to draft parallel lines and means on said carriage for presetting said ratio to be 1:1.

6. A drafting device as described in claim 5 wherein adjustably variable preset means are included to selectively preset at least one ratio in said ratio means and scale means having indicia are included to indicate selective ratio values.

7. A drafting device as described in claim 6 including motion control means on said carraige for simultaneously controlling said brake means and said arcuate motion about said vanishing point, said motion control means being freely rotatable in said carriage means to prevent inadvertent manual rotational movement from influencing said arcuate motion about said selective vanishing point.

8. A drafting device for use on a drafting surface to permit the drafting device to move upon the drafting surface in an arcuate motion about a vanishing point, comprising:

carriage means;

a rule on said carriage means defining at least one drafting edge;

a first wheel assembly means mounted to said carriage;

at least one second wheel assembly means mounted to said carriage, said first wheel assembly means and said second wheel assembly means being spaced from each other and adapted to support said carriage means upon the drafting surface and permit translatory movement thereof upon the drafting surface;

means for maintaining said wheel assembly means in contact with said drafting surface, each said wheel assembly means including contact disk means having a [convexly curved] peripheral surface adapted to provide each said wheel assembly with [single point] contact *at the tangent point of the periphery* of the disk with the drafting surface, said at least on edrafting edge on said rule being located substantially coincidental with a straight line reaching from said [single point contact] *tangent point* on said first wheel assembly means to said [single point contact] *tangent point* on said second wheel assembly means and coincidental with a true radial line extending to said vanishing point;

variable ratio transmission means on said carriage means for conveying rotational energy, said variable ratio transmission means linking said first wheel assembly means and said second wheel assembly means to each other;

extension means on said carriage for extending said first wheel assembly means, said second wheel assembly means and said drafting edge of said rule away from said ratio means to permit manual drafting of true radial lines along the total length of said drafting edge with a substantial vertical drafting pencil, unhampered by any portion of said means for conveying rotational energy, said extension means including extension drive means connecting said first wheel assembly means and said second wheel assembly means to said ratio means.

9. A drafting device as described in claim 8 wherein said variable ratio transmission means is infinitely variable and comprises at least one pair of substantially cone shaped members, each said cone shaped member having a smaller diameter at one end and a larger diameter at the other end, each said cone shaped member having an axis, said cone shaped members of said pair being in side by side relationship to each other in said variable ratio transmission means, said smaller diameter end of each said cone shaped member of said pair being juxtaposed to said larger end of an adjacent cone shaped member of said pair, power transfer roller means selectively locatable between said cone shaped members of each said pair, means for selectively bringing said power transfer roller means into and out of contact with said adjacent cone shaped members of said pair, means for selectively moving said power transfer roller means to a selected position between said adjacent cone shaped members for varying said ratio and means for bringing said power transfer roller in simultaneous frictional contact with each of said cone shaped members in said pair;

control means on said variable ratio transmission means for adjustably setting desired ratios in said variable ratio transmission means;

means on said variable transmission means for selectively presetting at least one ratio in said variable ratioo transmission means.

10. A drafting device as described in claim 9 wherein each said cone shaped member has a cylindrical portion approximately at the middle part of said cone shaped member, all said cylindrical portions being of equal diameter and juxtaposed to each other, whereby setting the power transfer roller means to the cylindrical sections permits said ratio between said wheel assemblies to be adjustably set at 1:1 to provide an infinitely large distance from the drafting device to said vanishing point for drafting parallel lines, and further comprising presetting means on said variable ratio transmission means for presetting said ratio to be 1:1.

11. A drafting device as described in claim 10 including adjustably variable preset means to selectively preset at least one ratio in said variable ratio transmission means.

12. A drafting device as described in claim 11 wherein each said wheel assembly means includes contact disk means having a [convexly curved] peripheral surface adapted to provide each said wheel assembly means with substantially single point contact on said drafting surface, all said contact disk means being of substantially the same outside diameter.

13. A drafting device as described in claim 12 wherein magnet means are included in said wheel assembly means, said contact disk means are of magnetizable material and further comprising;

ferrous, magnetizable underlay means located below said drafting surface, magnetic flux of said magnet means being concentrated through said contact disk means toward said drafting surface.

14. A drafting device as described in claims 8 or 12 wherein said means for maintaining said wheel assembly means in contact with said drafting surface includes magnetizable underlay means located below said drafting surface, at least one magnet on said carriage means and means for concentrating magnetic flux from each said at least one magnet toward said magnetizable underlay means.

15. A drafting device as described in claim 13 further comprising: — means for maintaining said wheel assembly means in firm contact with said drafting surface;

brake means on said wheel assembly means and;

brake control means on said carriage means for selectively locking and unlocking said brake means.

16. A drafting device as described in claim 15 including motion control means for manual actuation of said translatory movement of said carriage means upon said drafting surface, said motion control means being freely rotatable in said carriage means to prevent inadvertent manual rotational movement from influencing said arcuate motion about said selective vanishing point.

17. A drafting device as described in claim 15 wherein each said wheel assembly means includes magnetizable brake disk means having a smaller diameter than said contact disk means, one magnetic pole of said magnet means facing toward said contact disk means, the other magnetic pole of said magnet means facing toward said brake disk means, whereby to provide a substantially completed magnetic flux path from said one pole of said magnet, through said contact disk means, said underlay means and said brake disk means to said other pole of said magnet means.

18. A drafting device as described in claim 17 wherein said carriage means includes at [lesat] *least* one depending support glide means [sapced] *spaced* from said wheel assembly means to support said carriage [menas] *means* upon said drafting surface.

* * * * *